Figure 1:
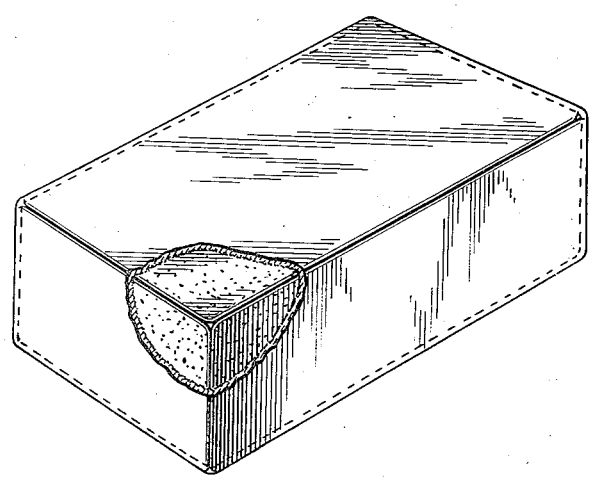
Figure 2:
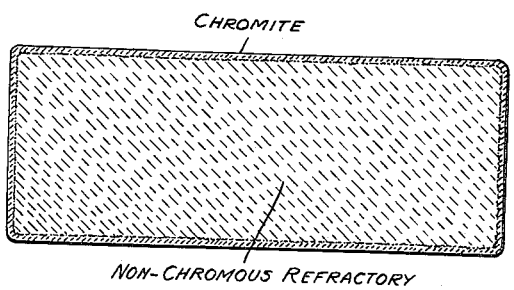

Jan. 9, 1934.  K. M. SIMPSON  1,943,263
REFRACTORY AND METHOD OF MANUFACTURE

Filed Feb. 23, 1932

Inventor
Kenneth M. Simpson

By Bacon & Thomas
Attorneys

Patented Jan. 9, 1934

1,943,263

UNITED STATES PATENT OFFICE 1,943,263

REFRACTORY AND METHOD OF MANUFACTURE

Kenneth M. Simpson, New York, N. Y., assignor to International Chromium Process Corporation, New York, N. Y., a corporation of Delaware Application February 23, 1932. Serial No. 594,673

13 Claims. (Cl. 25—156)

My invention relates to refractories and more particularly has reference to refractory bricks having the desirable characteristics of chromite brick but which are stronger and more economically manufactured.

Long experience with chromite bricks, composed substantially entirely of chromite, has shown that they are markedly susceptible to spalling under continued service. Although this tendency of chromite brick to spall is not fully understood in the art, it is so well recognized that the use of chromite brick in exposed positions in a furnace is generally avoided. Chromite, however, is a relatively neutral material, and its use as a refractory in metallurgical furnaces is highly desirable since it is only very slightly attacked by the most active acid and basic slags. It will thus be seen that chromite possesses the desirable property of being substantially non-reactive and the undesirable property of spalling under prolonged subjection to high temperature.

The customary non-chromous refractory materials, on the other hand, are less susceptible to spalling than chromite but they possess a high degree of chemical reactivity. For example, magnesite is strongly basic while the refractories such as fire-clay or silica or kaolin are strongly acid. These non-chromous refractories are therefore readily attacked and rapidly destroyed upon contact with their chemical opposites so that they are unsuitable for metallurgical furnaces under many conditions despite their freedom from spalling. The certain refractory materials, such as fire-clay and silica, have the further advantage over chromite in that they are considerably cheaper and their use would accordingly be preferred except for their chemical reactivity.

It is accordingly an object of my invention to provide a refractory possessing the desirable characteristics of both the chromite and the non-chromous materials and which does not possess the undesirable properties of either type of refractory. That is to say, the refractory article or brick of my invention is characterized by high heat resistance and freedom from spalling and by its chemical non-reactivity.

A further object of my invention resides in the provision of a refractory brick, the major component of which is fire-clay or other non-chromous refractory material while still possessing the aforesaid desirable characteristics of a chromite brick, thus effecting a substantial saving in the cost of the refractory.

A still further object of my invention is to provide a method whereby acid and basic refractories may be rendered neutral and given the desirable qualities of chromite.

Other object and advantages of my invention will appear from a more detailed description thereof.

I have discovered that bricks, the central core or principal part of which consists of fire-clay or other non-chromous refractory material, can be successfully coated with chromite and burned in kilns, and my invention, briefly stated, comprises a refractory of such non-chromous material covered or coated with chromite.

As a specific example of the manufacture of the chromite-coated brick of my invention, a suitable fire-clay mixture is first prepared and pressed into a crude brick in any known manner. The brick thus formed is then coated or covered with chromite by dipping, spraying or by any other suitable method for applying a coating. The coating composition preferably consists of 95% chrome ore and 5% of the same kind of fire-clay used in making the crude brick. This mixture of chrome ore and fire-clay is mixed with water and, if the coating is to be effected by dipping, a heavy slurry is made, and the crude fire-clay brick dipped therein. Several dips may be required if a heavy chromite coating is desired. If the coating is to be applied by spraying, any known form of spraying apparatus may be used for the aqueous mixture of chrome ore and fire-clay. If only a relatively small core of fire-clay is desired, the brick may be made in parts and the fire-clay core added in the final pressing operation. In molding the original crude fire-clay brick, I have found it desirable to arrange the press so that there are no sharp corners or edges on the brick, such operation aiding in the formation of the corners and edges of the chromite coating. In preferred operation, the non-chromous refractory core comprises from 60% to 85% by weight of the brick, and this core is covered with a ⅛ inch to ¼ inch coating containing 15% to 40% by weight of chrome ore.

The bricks, having been prepared and coated as above described, are now partly dried and then pressed in any standard brick press. After the pressing operation, the bricks are thoroughly dried and placed in kilns where they are burned at temperatures usually employed in the burning of high grade fire-clay bricks, or at higher temperature, if the kiln equipment permits. I have found that a temperature between 2500° and 2600° F. is suitable for the proper burning of the bricks. After this burning operation, the chrome ore coating will be found to be similar to the exterior of the present form of chrome brick, and it adheres so strongly to the core material that its bond with the latter is at least as strong and durable as the entire brick.

The finished chromite-coated brick, as compared with ordinary chrome brick is considerably cheaper and is characterized by greater strength and freedom from excessive spalling. As compared with fire-clay or kaolin brick, it is more refractory and free from attack by acid and basic slags.

What I claim is:

1. A refractory article comprising a core of non-chromous refractory material coated with chromite.

2. A refractory brick comprising a core of non-chromous refractory material and a coating of chromite.

3. As an article of manufacture, a fire-clay refractory coated with chromite.

4. A refractory brick comprising a chromite-coated core of a basic refractory material.

5. As an article of manufacture, a fire-clay brick having a chromite coating bonded thereto.

6. A process for rendering fire-clay bricks neutral which comprises coating the bricks with chromite.

7. A process for manufacturing refractories which comprises molding fire-clay into bricks, covering the bricks with chrome ore, and then burning the bricks.

8. A refractory brick comprising a major proportion of fire-clay and a minor proportion of chromite, the chromite being in the form of a coating for the fire-clay.

9. A refractory brick comprising between 60 and 85% fire-clay and from 15 to 40% chromite, the chromite constituting a coating for the fire-clay.

10. A refractory brick comprising a fire-clay core having a chromite coating of a thickness between ⅛ and ¼ inch.

11. A refractory brick composed of between 60 and 85% fire-clay and from 20 to 25% chromite, the fire-clay constituting the central core of the brick and the chromite being in the form of an outside coating bonded to the core.

12. A process for producing refractories from fire-clay and chrome ore which comprises pressing the major portion of the clay into bricks, mixing a small amount of the clay with the chrome ore and water, covering the bricks with the resultant mixture, and then drying and burning the bricks.

13. An article of manufacture, a silica brick having a chromite coating bonded thereto.

KENNETH M ........SON.